United States Patent [19]
Ahn et al.

[11] Patent Number: 6,009,071
[45] Date of Patent: Dec. 28, 1999

[54] OPTICAL DISK HAVING INFORMATION PITS WITH PROJECTIONS FORMED THEREIN

[75] Inventors: Young-man Ahn, Suwon; Hae-jung Suh, Seongnam, both of Rep. of Korea

[73] Assignee: Samsung Electronics Co., Ltd., Suwon, Rep. of Korea

[21] Appl. No.: 09/096,588

[22] Filed: Jun. 12, 1998

[30] Foreign Application Priority Data

Sep. 30, 1997 [KR] Rep. of Korea ........................ 97-50384

[51] Int. Cl.$^6$ ....................................................... G11B 7/24
[52] U.S. Cl. ........................................ 369/275.4; 428/64.4
[58] Field of Search ............................. 369/275.4, 275.1, 369/275.2, 280; 428/64.4, 64.1; 430/320, 321

[56] References Cited

U.S. PATENT DOCUMENTS

| | | | |
|---|---|---|---|
| 4,674,070 | 6/1987 | Tajima et al. | 369/44.37 |
| 5,353,277 | 10/1994 | Yasuda et al. | 369/275.4 |
| 5,602,824 | 2/1997 | Ooki et al. | 369/275.4 |
| 5,673,250 | 9/1997 | Mieda et al. | 369/275.4 |
| 5,799,007 | 8/1998 | Lee et al. | 369/275.4 |
| 5,904,969 | 5/1999 | Kamezaki et al. | 369/275.4 |

FOREIGN PATENT DOCUMENTS

| | | |
|---|---|---|
| 63-239630 | 10/1988 | Japan . |
| 63-263647 | 10/1988 | Japan . |
| 8-161750 | 6/1996 | Japan . |

*Primary Examiner*—Tan Dinh
*Attorney, Agent, or Firm*—Staas & Halsey

[57] ABSTRACT

An optical disk with an improved structure of an information pit, and a method of manufacturing the same. The optical disk has projections respectively projecting from bottom surfaces of a plurality of information pits. Also, in the optical disk, laser beams irradiated onto the information pits from an optical pickup to read information recorded on the optical disk are scattered by the projections. Thus, among the laser beams irradiated onto the information pits, the laser beams reflected toward the optical pickup are largely decreased, so that an amplitude and resolution of a reproduced signal are greatly increased, thereby significantly improving reproduction characteristics of the optical disk.

5 Claims, 5 Drawing Sheets

OPTICAL DISK HAVING INFORMATION PITS WITH PROJECTIONS FORMED THEREIN

BACKGROUND OF THE INVENTION

1. Field of the Invention

The present invention relates to an optical disk and a method for manufacturing the same, and more particularly, to an optical disk with an improved information pit structure and a method for manufacturing the same.

2. Description of the Related Art

An optical disk such as a compact disk (CD) or a digital versatile disk (DVD) used as a medium for recording and/or reproducing audio or video information, as shown in FIGS. 1 and 2, includes information pits 2 recessed from a reference surface 1a, and the information is written based upon the information pits 2. The reference surface 1a corresponds to the upper surface of a land on an optical disk 1 or that of a groove. The information written on the optical disk 1 can be reproduced by an optical pickup (not shown) of a recording/reproducing apparatus, as is well known. To reproduce the information of the optical disk 1, the optical pickup irradiates a laser beam LB onto the reference surface 1a of the optical disk 1 and detects the amount of the laser beam reflected from the optical disk 1. Since the irradiated laser beam LB is scattered at the portion corresponding to the information pit 2, the amount of the laser beam reflected toward the optical pickup is reduced. The reduction in the amount of the laser beam LB occurs in all the information pits 2, and the information of the optical disk 1 can be reproduced by detecting the change in the reflected light amount in the information pit 2. Thus, the less the amount of the laser beam reflected from the information pit 2, the better the information reproduction characteristics. It is generally known that the amount of the light reflected from the information pit 2 becomes a minimum when the depth (d) of a bottom surface 2a of the information pit 2 is set to $\lambda/4n$ ($\lambda$: the wavelength of the laser beam and n: refractive index of the optical disk).

In the conventional optical disk, to adjust the depth of the information pit appropriately, when manufacturing a master board for manufacturing the optical disk, the thickness of a photoresist layer must be consistently controlled. Also, even if the appropriate depth of the information pit is adjusted correctly, the laser beam reflected from the bottom surface of the information pit may be detected by an optical pickup, which has an adverse effect on the information reproduction characteristics of the optical disk.

SUMMARY OF THE INVENTION

To solve the above problems, it is an object of the present invention to provide an optical disk with an improved information pit, by which a laser beam irradiated onto an information pit is suppressed from being reflected toward an optical pickup.

It is another object of the present invention to provide a method of manufacturing an optical disk, by which a laser beam irradiated onto an information pit is suppressed from being reflected toward an optical pickup.

Additional objects and advantages of the invention will be set forth in part in the description which follows and, in part, will be obvious from the description, or may be learned by practice of the invention.

Accordingly, to achieve the first object of the present invention, there is provided an optical disk including a plurality of information pits for recording predetermined information; and a plurality of projections respectfully projecting from bottom surfaces of the plurality of information pits to scatter the laser beam irradiated onto each information pit.

To achieve the second object of the present invention, there is provided a method of manufacturing an optical disk having predetermined information recorded by a plurality of information pits, including the steps of preparing a master board having a photoresist layer in its one plane; exposing portions of the photoresist layer where the plurality of information pits are to be formed, to at least a pair of laser beams partly overlapping with each other; forming concavities of a same pattern as the information pits of the optical disk by etching the exposed portions; and forming the optical disk using the master board having the concavities.

BRIEF DESCRIPTION OF THE DRAWINGS

The above and other objects and advantages of the present invention will become more apparent by describing in detail a preferred embodiment thereof with reference to the attached drawings in which.

DESCRIPTION OF THE PREFERRED EMBODIMENT

Figure 1:
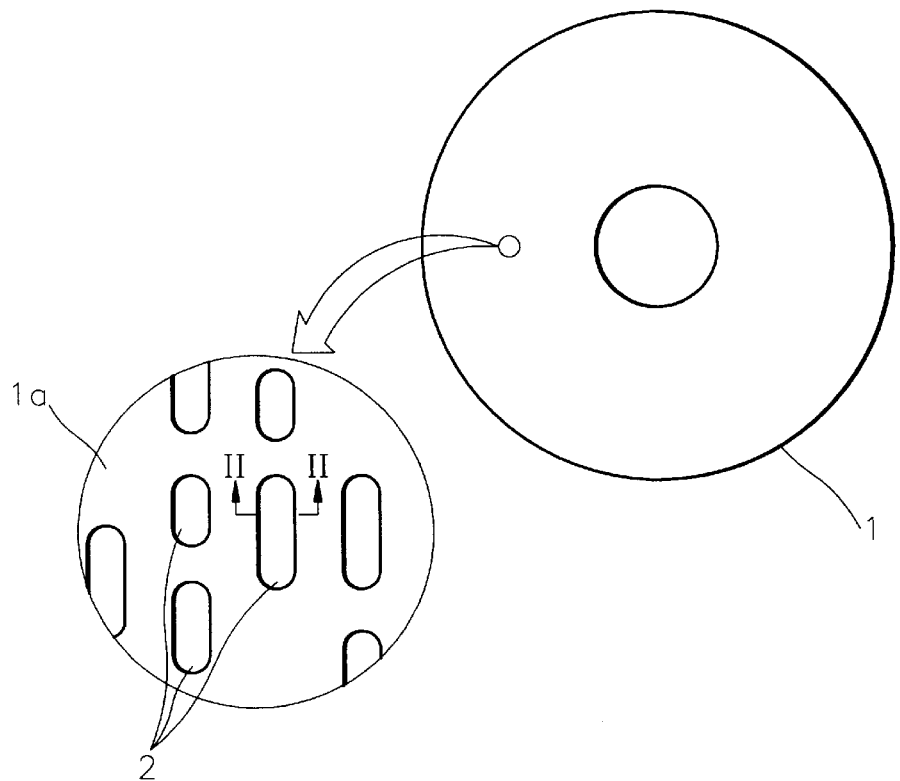
FIG. 1 is a schematic plan view illustrating an example of a conventional optical disk.
Figure 2:
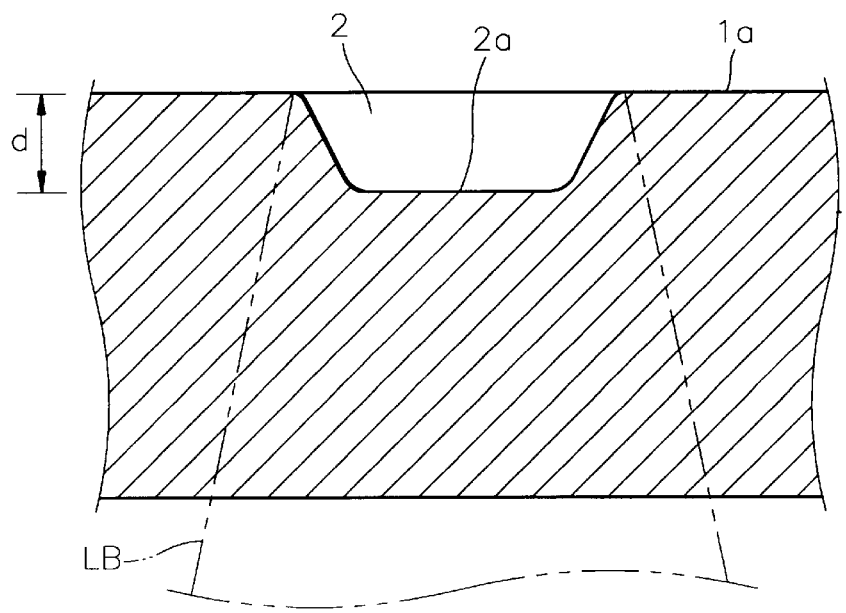
FIG. 2 is a cross-sectional view schematically showing the optical disk shown in FIG. 1, taken along a line II—II.

Reference will now made in detail to the present preferred embodiment of the present invention, examples of which are illustrated in the accompanying drawings, wherein like reference numerals refer to the like elements throughout. The embodiment is described below in order to explain the present invention by referring to the figures.

Figure 3:
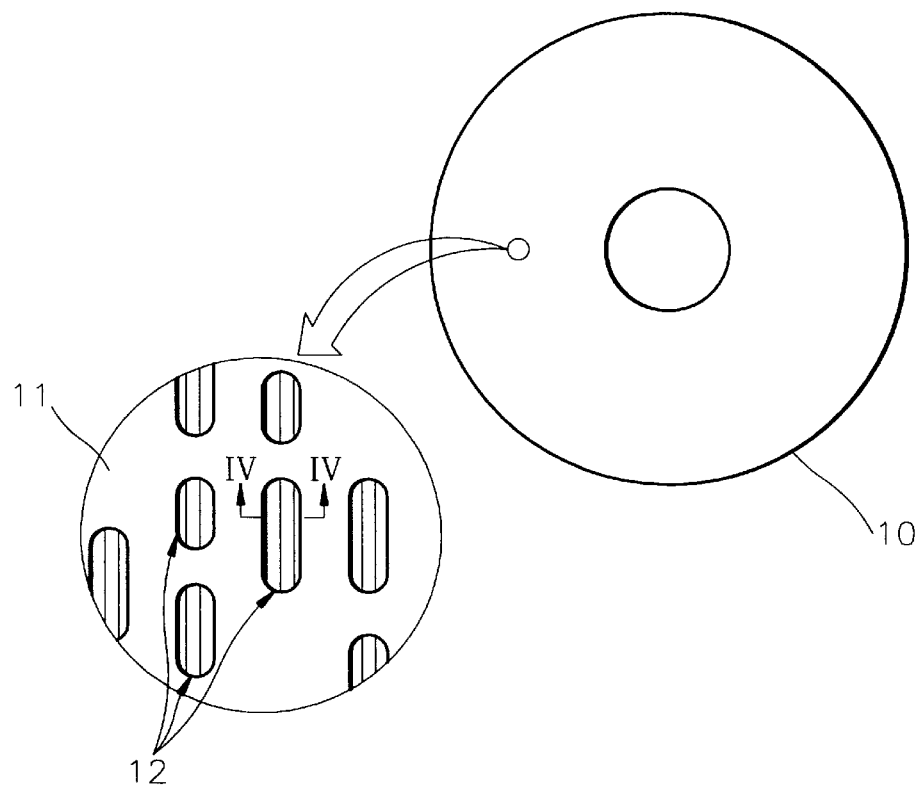
FIG. 3 is a cross-sectional view schematically showing an example of an optical disk according to an embodiment of the present invention.
Figure 4:
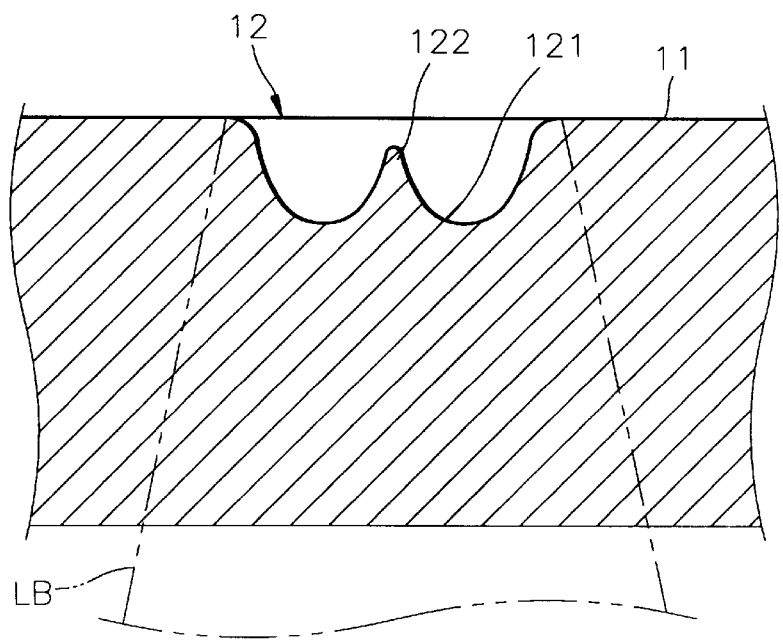
FIG. 4 is a cross-sectional view schematically showing the optical disk shown in FIG. 3, taken along a line IV—IV.

Referring to FIGS. 3 and 4, a feature of the present invention resides in the fact that an optical disk 10 according to an embodiment of the present invention includes information pits 12 recessed from a reference surface 11 by a predetermined depth, and a projection 122 is formed in a respective information pit 12. The projection 122 projects with respect to a bottom surface 121 of the information pit 12. The projection 122 rises to a height which is lower than the reference surface 11, and divides the information pit 12 into two u-shaped cross-sections.

To reproduce the information recorded on the optical disk 10, a laser beam LB irradiated onto the information pit 12 is scattered by the projection 122 while the laser beam LB is irradiated onto the reference surface 11 of the optical disk 10 by an optical pickup (not shown) incorporated in the recording/reproducing apparatus. Accordingly, with regard to the laser beam LB irradiated onto the information pit 12, the amount of the laser beam LB reflected toward the optical pickup is greatly decreased. Thus, in the optical disk 10 according to the embodiment of the present invention, a difference between the amounts of the laser beams reflected toward the optical pickup from the reference surface 11 and from the information pit 12 becomes greater than in the conventional optical disk 1. Accordingly, the amplitude and resolution of a reproduced signal are increased, that is, the reproduction characteristics are improved.

A method of manufacturing the optical disk 10 having the above-described information pit 12 will be described with reference to FIGS. 5A through 6C.

Figure 5A:
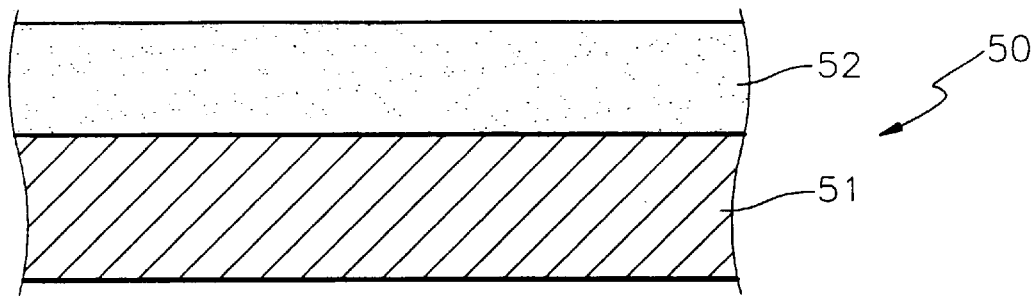
FIGS. 5A through 5C and FIGS. 6A through 6C illustrate a method of manufacturing the optical disk shown in FIGS. 3 and 4.
Figure 5B:
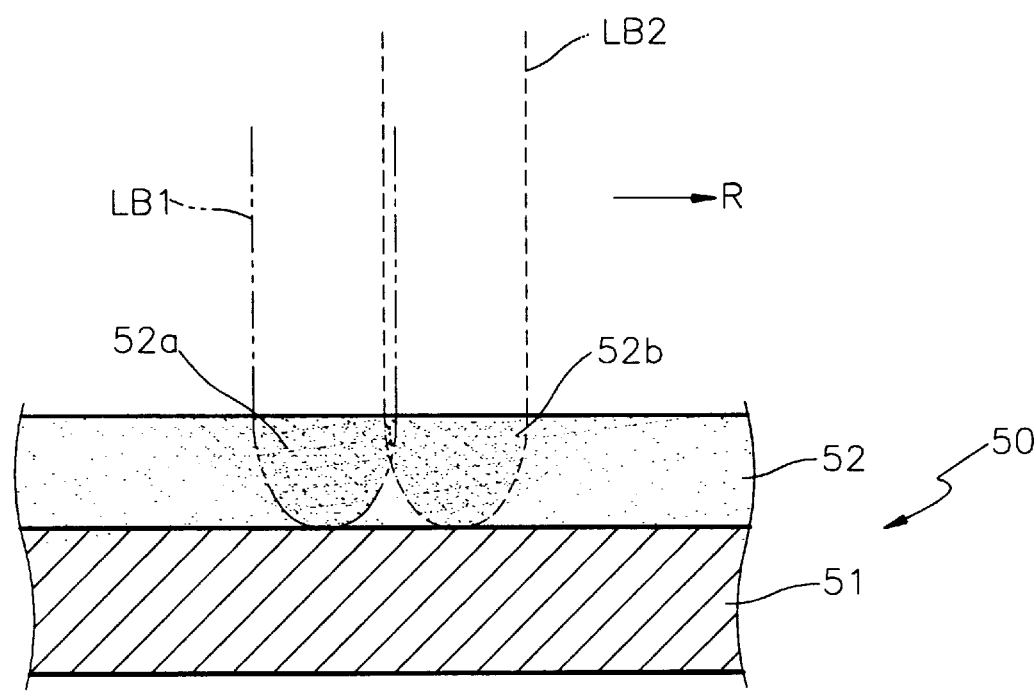

First, as shown in FIG. 5A, a photoresist solution is coated on an upper surface of a carefully polished glass substrate 51 and hardened to form a photoresist layer 52, thereby forming a master board 50. While the master board 50 is rotated and simultaneously laser beams LB1 and LB2 shown in FIGS. 5B are slowly moved in a radial direction of the master board 50, portions of the photoresist layer 52 of the master board 50, where the information pits of the to-be-manufactured optical disk are to be formed, are exposed.

Here, the laser beams LB1 and LB2 are provided to partly overlap with each other, which is the main feature of the method for forming the optical disk according to the present invention. As is well known, the intensity of the respective laser beams LB1 and LB2 is strongest in the center thereof and becomes weaker toward the periphery thereof. Thus, in the photoresist layer 52, the central portions of the respective laser beams LB1 and LB2 are exposed deeply, and the center of the overall exposed portions, i.e., the overlapping portions of the laser beams LB1 and LB2, is exposed relatively shallowly.

Figure 5C:
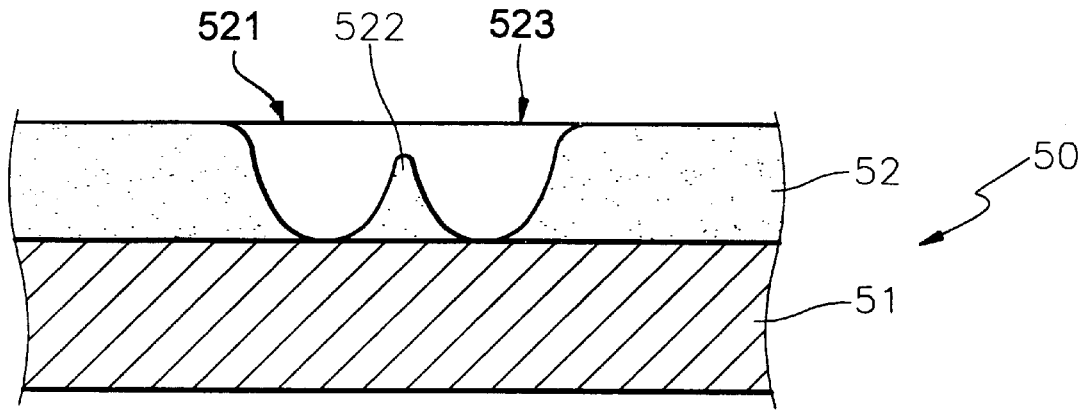

Thereafter, exposed portions 52a and 52b are etched and cleaned to form concavities 521 and 523 having a projection 522 in the center of the master board 50, as shown in FIG. 5C.

Figure 6A:
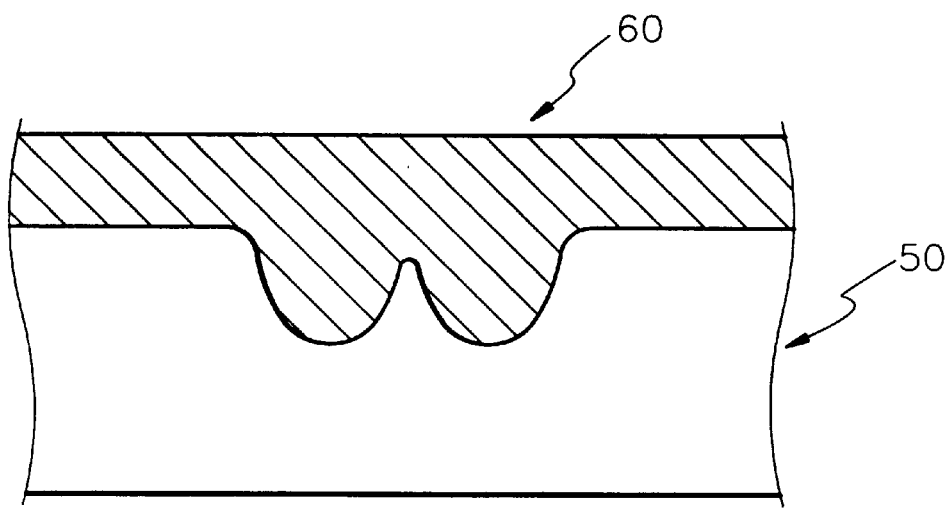
Figure 6B:
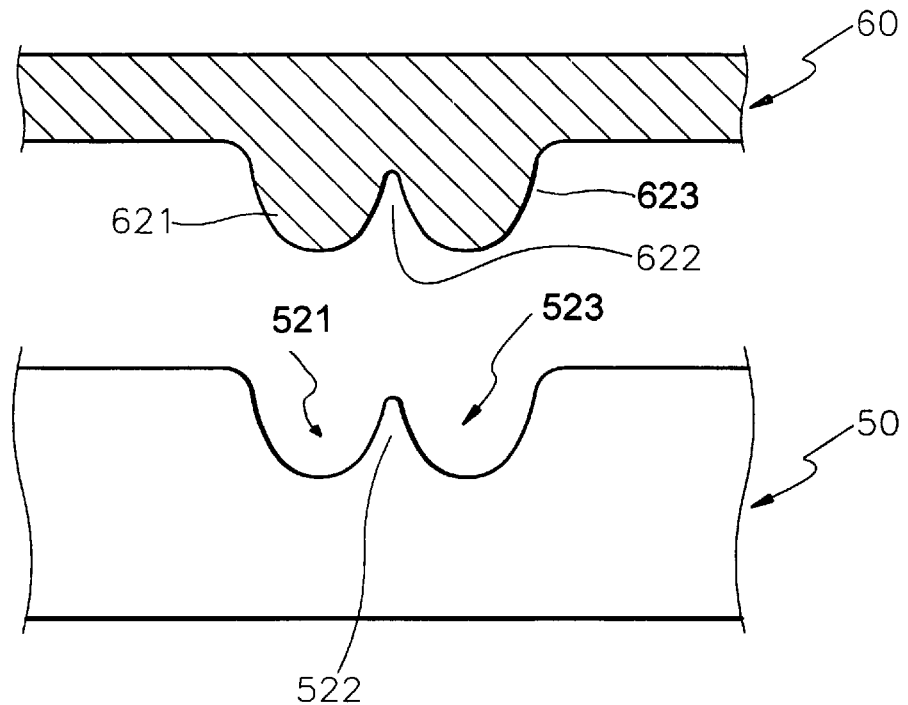
Figure 6C:
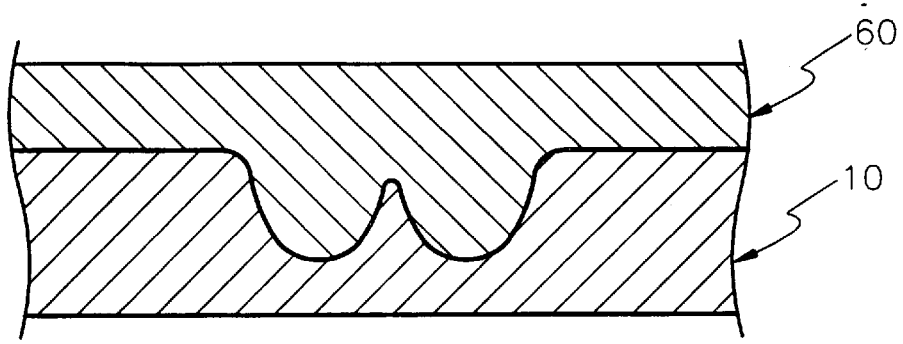

As shown in FIG. 6A, a metal such as nickel is coated on the master board 50 where the concavities 521, 523 are formed, thereby forming a stamper 60. Then, as shown in FIG. 6B, if the stamper 60 is separated from the master board 50, the surface irregularities of the stamper 60 are exactly opposite to those of the master board 50. In other words, the portion of the concavities 521, 523 in the master board 50 corresponds to projections 621, 623 in the stamper 60. The projection 522 of the master board 50 corresponds to a concavity 622 recessed with respect to the rising edges of the projection 621 in the stamper 60. If plastic molding like injection molding is performed using the stamper 60, as shown in FIG. 6C, the optical disk 10 having the surface irregularities opposite to those of the stamper 60 but the same as those of the master board 50 is manufactured, thereby forming in the optical disk 10 the information pit 12 having the same pattern as that of the concavities 521, 523 in the master board 50. Also, the projection 122 of the same shape as the projection 522 between the concavities 521, 523 in the master board 50 is formed in the information pit 12.

The above-described method of manufacturing an optical disk is similar to the conventional method but is different in that two laser beams LB1 and LB2 partly overlap with each other to then perform exposure.

The laser beams LB1 and LB2 may be emitted from two laser beam sources. Otherwise, they may be emitted from one single laser beam source and then separated into two beams through a beam splitter.

In the present invention, a projection 122 is formed in the center of the information pit 12. Alternatively, for example, three laser beams are arranged in a line, the central laser beam and the right laser beam are partly overlapped with each other, the central laser beam and the left laser beam are partly overlapped with each other, and then the portion where the information pit is to be formed is exposed to the laser beams, so that a pair of parallel projections may be formed in the information pit.

As described above, according to the present invention, an optical disk having a projection projecting with respect to a bottom surface of each of a plurality of information pits, and formed within each information pit, can be obtained. Also, in the optical disk, since the laser beam irradiated onto the information pit from an optical pickup is scattered by the projection, among the laser beams irradiated onto the optical disk, the amount of the laser beam reflected toward the optical pickup is extremely decreased. Thus, the amplitude and resolution of a reproduced signal are increased, that is, the reproduction characteristics are improved.

What is claimed is:

1. An optical disk reproducible by a laser beam, comprising:

a plurality of information pits to record information and each information pit having a bottom surface; and a plurality of projections respectively projecting from the bottom surfaces of the plurality of information pits, to scatter the laser beam irradiated onto the information pits.

2. The optical disk as claimed in claim 1, wherein each information pit has outer walls which are higher than the respective projection.

3. The optical disk as claimed in claim 1, wherein each information pit is divided into two u-shaped cross-sections by the respective projection.

4. The optical disk as claimed in claim 2, wherein each information pit is divided into two u-shaped cross-sections by the respective projection.

5. The optical disk as claimed in claim 1, wherein each projection extends from the respective bottom surface and in a lengthwise direction of the corresponding information pit.

* * * * *